United States Patent [19]

McCusker

[11] 4,172,367

[45] Oct. 30, 1979

[54] TORQUE TUBE AND METHOD FOR MOUNTING AND MAINTAINING POWER TRANSMITTING FORCES

[76] Inventor: James D. McCusker, 176 Williamson Rd., Bergenfield, N.J. 07621

[21] Appl. No.: 797,361

[22] Filed: May 16, 1977

[51] Int. Cl.² .................................................. F16C 1/06
[52] U.S. Cl. ............................................... 64/4; 64/3; 64/32 R; 74/606 R; 74/607
[58] Field of Search ............... 64/3, 4, 15 B, 32 R; 74/607, 606 R, 11, 15.63; 403/180, 182, 341, 293, 286, 335, 336, 337, 338, 287, 183, 167, 168

[56] References Cited

U.S. PATENT DOCUMENTS

| | | | |
|---|---|---|---|
| 1,024,419 | 4/1912 | Resch | 115/17 |
| 1,330,550 | 2/1920 | Richard | 74/607 |
| 1,693,045 | 11/1928 | Murray | 74/607 |
| 2,768,811 | 10/1956 | Le Geu | 64/4 |
| 2,857,175 | 10/1958 | Browning | 403/180 |
| 3,136,165 | 6/1964 | Pitts | 74/11 |
| 3,148,556 | 9/1964 | Gibbs | 74/606 |
| 3,174,781 | 3/1965 | Eastman | 403/182 |
| 3,435,778 | 4/1969 | Ascuitto | 64/4 |
| 3,888,134 | 6/1975 | Miranda | 74/606 R |
| 4,003,444 | 1/1977 | Nobutomo | 74/607 |
| 4,020,715 | 5/1977 | Sollars | 74/606 R |

OTHER PUBLICATIONS

1975 Buick Service Manual, Section 5, p. 1, 1974, Figure 7B66.

*Primary Examiner*—Charles J. Myhre
*Assistant Examiner*—R. C. Turner
*Attorney, Agent, or Firm*—Ralph R. Roberts

[57] ABSTRACT

This invention provides a torque tube or coupling housing which is adapted to join a power transmitting member to a power driven member. A rectangular or square metal tube provides this torque tube which has two parallel, spaced-apart outer surfaces. In these spaced-apart surfaces and preferably near their central portions are formed aligned pilot holes. Using these pilot holes as an axis appropriate mounting holes are formed in each of the planar surfaces. The torque tube is then bolted in place to provide a fixed coupling of the power members. As a method, this torque tube provides the steps for joining a power output to a power receiving device wherein the coupling is drilled to provide mounting holes measured from the to be mounted component.

6 Claims, 2 Drawing Figures

TORQUE TUBE AND METHOD FOR MOUNTING AND MAINTAINING POWER TRANSMITTING FORCES

BACKGROUND OF THE INVENTION

1. Field of the Invention

With reference to the classification of art as established in and by the United States Patent and Trademark Office the present invention is believed found in the general Class entitled, "Motor Vehicles" (Class 180) and the subclass entitled, "motor carrying attachments" (subclass 11) and also "transmission mechanism" (subclass 70). Also of note is the Class entitled, "Machine Elements, Shafting and Flexible Shaft Couplings" (Class 64) and the subclass entitled, "shaft and housing connections" (subclass 4).

DESCRIPTION OF THE PRIOR ART

Torque tubes as a concept are old in the art and have been used from at least the time of the early automobile. As far as is known, these torque tubes or couplings are made to accept or satisfy specific conditions. Usually the torque tube or coupling is a casting with at least two machined surfaces of which one often has a pilot diameter. Among the several patents disclosing a torque tube application are U.S. Pat. Nos. 1,341,615 to HUDSON as issued on May 25, 1920; 1,358,079 to HUDSON also as issued Nov. 9, 1920; 1,915,015 to DALAGER as issued June 30, 1933; 2,292,717 to RUBINSTEIN as issued on Aug. 11, 1942; 2,726,552 to GUMPPER, etal., as issued on Dec. 13, 1955; 2,977,807 as issued to CONOVER on Apr. 4, 1961; 3,242,692 to SWEET as issued on Mar. 29, 1966; 3,365,912 to SELIBER as issued on Jan. 30, 1968; 3,435,778 as issued to ASCUITTO, etal., on Apr. 1, 1969 and 3,918,272 to HONOLD etal., as issued on Nov. 11, 1975.

In these and other known connector apparatus a specific concept and housing have been disclosed. In many of these patents the securing in a fixed condition has been by bolting usually through outwardly extending flange portions as seen in U.S. Pat. No. 1,915,015. Openings into the coupling for inserting the bolts from the interior of the coupling is shown in U.S. Pat. No. 2,726,522. Formed shoulders are also shown in this patent. The present invention employs a coupling housing in which mounting holes are laid out using the spacing of and on that unit to be connected. The coupling housing is of a tubular construction with each resulting housing a cut off portion of a longer tube. Two exterior planar faces on each coupling housing are parallel and in each face is formed a pilot hole which is aligned with a pilot hole in the opposite face. This pilot hole is used as an axis to lay out and drill mounting holes to accommodate the power unit to be bolted to this face.

SUMMARY OF THE INVENTION

This invention may be summarized at least in part with reference to its objects.

It is an object of this invention to provide, and it does provide, a simple coupling or torque tube of rectangular tubing having parallel faces of spaced-apart walls. In each of these parallel faces are formed aligned pilot holes which are used to provide an axis for drilling a plurality of mounting holes for the power member to be mounted on that face. The pilot hole is enlarged to the extent necessary to fully pass the shaft or coupling of the mounted unit.

It is a further object of this invention to provide a metal, rectangular, tubular coupling having at least two parallel end walls in which are formed aligned pilot holes substantially centrally positioned.

It is a still further object of this invention to provide and it does provide, a method for coupling together power units. This coupling or housing is drilled at the point of use to adapt this torque tube housing to a particular power output and also to a particular power transmitting and receiving member. Bolts are passed from the inside of the coupling through drilled holes therein and into the mounting holes in the power transmitting member and the receiving member.

In brief, in one of the faces the power transmitting coupling and a plurality of mounting holes are laid out and drilled to accommodate the power transmission output unit. In the other face of the power transmitting coupling the pilot hole is the axis used to lay out and drill holes to suit the mounting holes in the power receiving unit. The pilot holes are enlarged to accept the output and/or input shaft and means by which the two shafts are coupled together. Through the open sides of this rectangular torque tube the bolts which are utilized to secure the members together are brought. These bolts pass through the drilled holes and into tapped holes in the unit or into through holes. Nuts are affixed to the bolts when through holes are present. These bolts and/or nuts secure the input and output units to the respective faces of the torque tube.

The torque tube of this invention includes a thin wall, tubular member preferably rectangular or square which is sawed off from a longer length of tubing. In opposite faces or walls of this torque tube are formed aligned holes which are pilot holes. The mounting holes for the power output are matched to and transferred from the actual output unit. This pattern and size of the holes is transferred to the planar face of the torque tube where the required number, size and pattern of drilled holes is made. In a like manner the receiving unit which may be a thrust bearing or the like has the mounting holes also measured on and around the pilot hole in the opposite face of the torque tube. These drilled holes are made to accommodate the various holes in this to be mounted unit. The holes in this face of the coupling are drilled to accommodate the required size, pattern, spacing and holes of the receiving unit.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen a specific embodiment of the torque tube or coupling and showing a preferred rectangular or square tube cut from a longer tube. These embodiments have been chosen for the purposes of illustration and description as shown in the accompanying drawing wherein:

BRIEF DESCRIPTION OF THE DRAWING

In the following description and in the claims various details are identified by specific names for convenience and are intended to be generic in their application. Corresponding reference characters refer to like members in the two figures of the drawing.

Figure 1:
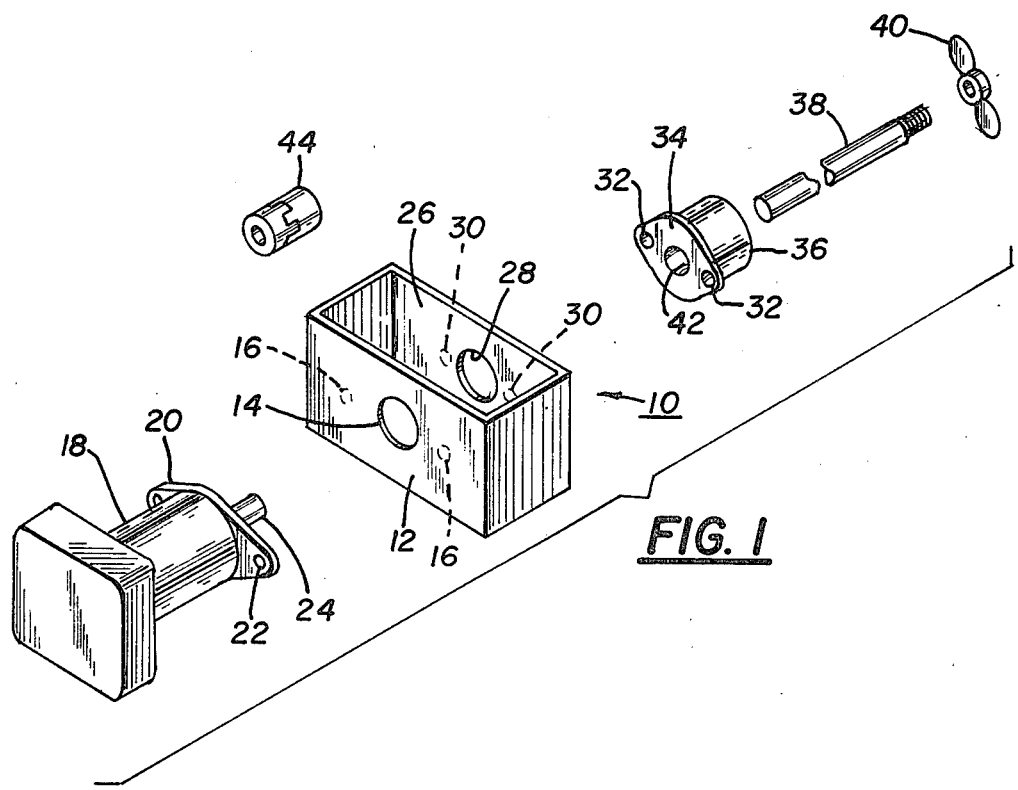
FIG. 1 represents an isometric, exploded view showing a rectangular torque tube with a power transmission member for attachment to one side, a bearing and propeller shaft mountable in the other side or the torque tube and a jaw coupling for connecting the output and the propeller shaft into a combined unit.

The drawing accompanying, and forming part of, this specification discloses certain details of construction for the purpose of explanation of the invention, but it should be understood that structural details may be modified in various respects without departure from the invention and that the invention may be incorporated in other structural forms than shown.

TORQUE TUBE OF FIG. 1

Referring now to the drawing and in particular to FIG. 1 it is to be noted that there is depicted a rectangular torque tube generally indicated as 10. This torque tube has a near face 12 in which is formed a pilot hole 14 and, in the present instance, two mounting holes 16. A power transmission member 18 has a mounting flange unit 20 in which are formed holes 22, which holes are used to provide the same spacing and size as holes 16 formed in the rectangular torque tube 10. An output shaft 24 is adapted to pass through hole 14 when the transmission member 18 is bolted in place. Holes 22, if threaded, require only bolts for securing the transmission to the torque tube. The bolts are brought into the interior of the tube then through the holes 16 into the tapped holes 22. When holes 22 are smooth holes cap screws and nuts with lock washers are used.

In wall 26, which is opposite and parallel to wall 12, is formed a pilot hole 28 in which is formed mounting holes 30. These mounting holes are sized and spaced to mate with and match holes 32 formed in the flange 34 of a thrust bearing 36. A propeller shaft 38 may be carried in this thrust bearing 36 and carry on its outer end a propeller 40. The propeller 40 is of conventional construction and shaft 38 passes through a hole 42 in bearing 36 and through hole 28 in the torque tube. A jaw coupling 44 mounts on and joins the shaft 24 and the propeller shaft 28 after the torque tube 10 has been bolted in place. The coupling 44 is interior of the walls 12 and 26 and is conventional and may be provided in many like forms.

ALTERNATE TORQUE TUBE AS SEEN IN FIG. 2

Figure 2:
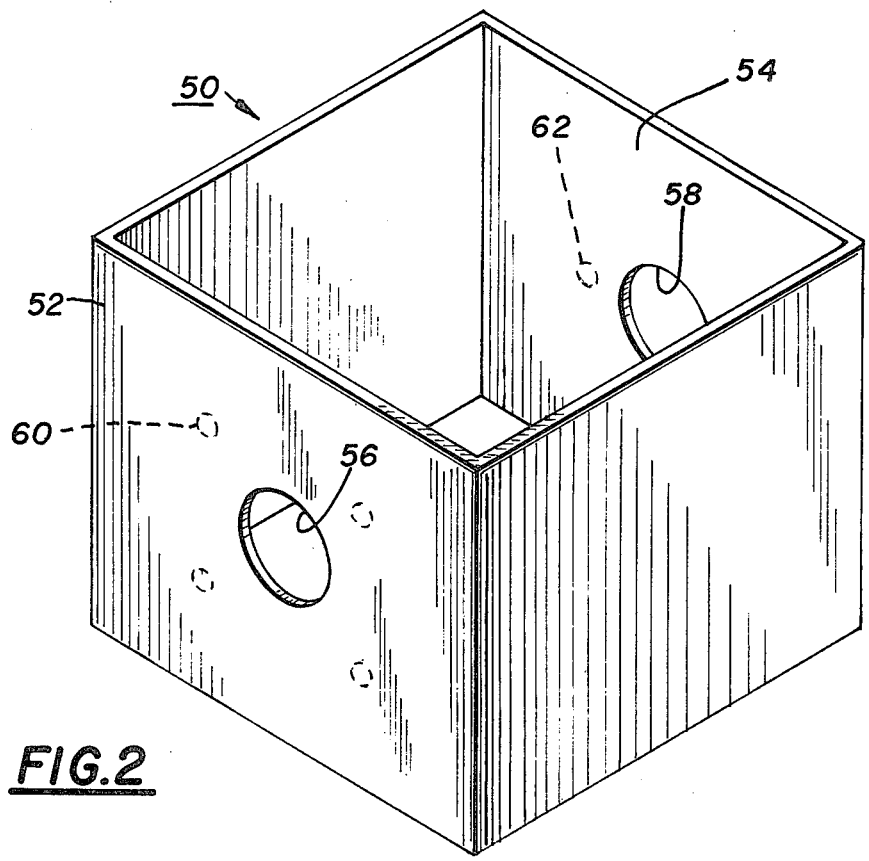
FIG. 2 represents in an enlarged scale a rectangular torque tube showing the use of a square tube rather than a rectangular tube length of tubing cut to length.

There is depicted in FIG. 2 a torque tube which is made of a square cut off piece of tubing rather than a length of rectangular tubing as shown in FIG. 1. This square tube generally indicated as 50 has a near face 52 and a far face 54 in which are respectively formed pilot hols 56 and 58. These holes are aligned and preferably are more-or-less centrally disposed in the opposite planar faces. These pilot holes form the axis for mounting holes 60 in the near face and mounting holes 62 in the far face. These formed mounting holes are sized and spaced to mate with the unit which is mounted on this square torque tube.

In use, the torque tube is a coupling between a power output and a power receiving member. This coupling requires that the pilot holes be aligned and that the opposite faces of a torque tube be parallel. The torque tube may have two parallel faces having rounded ends, a hex angle configuration or any other shaped end supporting members as long as the tube faces are substantially similar and are parallel. The pilot hole on the near face establishes the axis to accommodate the spacing and size of the holes to be drilled for mounting the power output unit. The pilot hole is enlarged when required to freely pass the power output shaft.

In the opposite face of the torque tube a pilot hole is provided to establish an axis for spacing and an arrangement of the mounting holes of the unit which is to be formed in this face of the torque tube for mounting of this unit to the tube. Two, three or more holes may be required to mount a power transmitting or receiving unit. The opposite sides of the torque tube permits bolts to be passed from the inside of the torque tube to and through the drill holes and into and through the mounting holes in the flanges or faces of the units to be mounted to the torque tube whether the mounting holes in the units are threaded for receipt of a threaded cap screw or are through holes through which may be passed bolts secured by nuts. No difficulty of manipulation occurs because of the open sides in the torque tube. The jaw coupling or similar type of coupling is used to connect the power output shaft with the driven shaft member which is connected by the torque tube.

Preferably the torque tube is made of steel or aluminum tubing cut to a determined length from a longer piece of tubing. Initially a pilot hole is drilled in each of the planar, parallel, spaced-apart, opposite faces. From this pilot hole size, spacing and positioning is made for the mounting holes that are drilled to accommodate the mounted transmission member.

The torque tube or coupling of this invention enables a tube to be prepared to the extent that the coupling is cut from a longer tube. In a pair of parallel, spaced-apart faces are formed pilot holes which lay on a common axis which is normal to these exterior faces. These pilot holes are used to establish a transfer for size and pattern of holes in the power transmitting or receiving units. Mounting holes are then drilled in these faces. The torque tube may thus be taken to the point of use and then drilled to couple power units together without a specially prepared coupling. The two open sides enable manipulation of bolts for mounting and the securing of a coupling means with the maximum of access. These open sides produce a torque tube that is dry. It is not intended to contain or retain any level of lubricant.

As a method this torque tube concept provides for the forming of a torque tube and fixed coupling for mounting a power output member and a power receiving member, this coupling member of tubular configuration and adapted for the mounting of selected power members whose mounting holes fall within the planar extents of the coupling member. The method includes the steps of providing a tubular member having at least a pair of spaced-apart walls whose outer planar faces are parallel to each other; forming a pilot hole in each of a pair of spaced-apart walls, said pilot holes axially aligned to form a common axis which is normal to the planar face of these spaced-apart walls; providing a planar surface in each spaced-apart wall sufficient to accommodate mounting holes formed in that spaced-apart wall and in one wall forming a plurality of holes in a pattern and size according to the pattern of holes previously formed in the power output member and in the opposite wall forming a plurality of holes in a pattern and size according to the pattern of holes previously formed in the power receiving member, and providing an internal space between said spaced-apart walls so that shaft portions of the power output and receiving members may extend into said internal space and providing means for connecting these shaft portions to establish a power transfer from one shaft to another.

Terms such as "up", "down", "bottom", "top", "front", "back", "in", "out" and the like are applicable to the two embodiments shown and described in conjunction with the drawing. These terms are merely for the purposes of description and do not necessarily apply to the position in which the torque tube or coupling may be constructed or used.

While particular embodiments of this torque tube and coupling have been shown and described it is to be understood that modifications may be made within the scope of the accompanying claims and protection is sought to the broadest extent the prior art allows.

What is claimed is:

1. A torque tube and fixed coupling for mounting and coupling a power output member and a power receiving member, this torque tube of tubular configuration and adapted for the mounting of selected power members whose mounting holes fall within the planar extents of the tubular configuration, this tubular coupling including: (a) a tubular member having at least a pair of spaced-apart walls whose outer planar faces are parallel to each other, (b) a pilot hole formed in each of said pair of spaced-apart walls, these pilot holes axially aligned to form a common axis which is normal to the planar face of these spaced-apart walls; (c) a planar surface in each spaced-apart wall sufficient to accommodate mounting holes formed in that spaced-apart wall with one wall having a plurality of holes formed in a pattern and size according to the pattern of holes formed in the power output member and in the opposite wall of a plurality of holes in a pattern and size according to the pattern of holes formed in the power receiving member and after these mounting holes are formed enlarging the pilot holes to freely pass the shafts of the power output member and the power receiving member; (d) an internal space between said spaced-apart walls providing for the extending into said internal space of shaft portions of the power output and receiving members and means for connecting these internally extending shaft portions to provide a power transfer from one shaft to another, and (e) at least one permanently open side of the torque tube which provides always ready access for inserting tightening and adjusting bolts, nuts and couplings in the interior of the torque tube and said tube interior is absent an intended level of lubricant.

2. A torque tube as in claim 1 in which the tube is a rectangular metal tube having a wall thickness of less than one-quarter inch, this tube cut from a longer length of tubing having a substantially like configuration throughout its length.

3. A torque tube as in claim 2 in which the tube is of steel.

4. A torque tube as in claim 1 in which the tube is a square metal tube having a wall thickness of less than one-quarter inch, this tube cut from a longer length of tubing having a substantially like configuration throughout its length.

5. A torque tube as in claim 1 in which the walls of the tube have substantially the same thickness.

6. A torque tube as in claim 1 in which there are two opposed open sides of the tube.

* * * * *